US010565133B2

(12) United States Patent
Gopal

(10) Patent No.: US 10,565,133 B2
(45) Date of Patent: *Feb. 18, 2020

(54) TECHNIQUES FOR REDUCING ACCELERATOR-MEMORY ACCESS COSTS IN PLATFORMS WITH MULTIPLE MEMORY CHANNELS

(71) Applicant: INTEL CORPORATION, Santa Clara, CA (US)

(72) Inventor: Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/713,001

(22) Filed: Sep. 22, 2017

(65) Prior Publication Data
US 2019/0095365 A1 Mar. 28, 2019

(51) Int. Cl.
| G06F 13/16 | (2006.01) |
| G06F 3/06 | (2006.01) |
| G06F 12/0811 | (2016.01) |
| G06F 12/0842 | (2016.01) |
| G06F 13/42 | (2006.01) |

(52) U.S. Cl.
CPC ........ *G06F 13/1673* (2013.01); *G06F 3/0611* (2013.01); *G06F 3/0656* (2013.01); *G06F 3/0683* (2013.01); *G06F 12/0811* (2013.01); *G06F 12/0842* (2013.01); *G06F 13/4282* (2013.01); *G06F 2212/2542* (2013.01); *G06F 2212/283* (2013.01); *G06F 2213/0026* (2013.01)

(58) Field of Classification Search
None
See application file for complete search history.

(56) References Cited

U.S. PATENT DOCUMENTS

| 10,073,885 | B2 * | 9/2018 | Das | G06F 16/24542 |
| 2008/0114806 | A1 * | 5/2008 | Kosche | G06F 11/3409 |
| 2008/0127149 | A1 * | 5/2008 | Kosche | G06F 8/443 |
| | | | | 717/158 |

(Continued)

*Primary Examiner* — Henry Tsai
*Assistant Examiner* — Aurangzeb Hassan
(74) *Attorney, Agent, or Firm* — Law Office of R. Alan Burnett, P.S

(57) ABSTRACT

Methods and apparatus for reducing accelerator-memory access costs in platforms with multiple memory channels. The apparatus includes a computing platform having multiple accelerators and multiple memory devices accessed via a plurality of memory channels. Jobs are submitted via software running on the computing platform to access a function to be offloaded to an accelerator. Under the offloaded function, the accelerator accesses one or more buffers that collectively requiring access via multiple memory channels among the plurality of memory channels. Accelerators having an available instance of the function are identified, and an aggregate cost for accessing the one or more buffers via the multiple memory channels are calculated for each of the accelerators. The accelerator with the least aggregate cost is then selected to offload the function to. New Instruction Set Architecture (ISA) instructions are also disclosed to identify memory pages and memory channels used for buffers.

21 Claims, 7 Drawing Sheets

(56) References Cited

U.S. PATENT DOCUMENTS

| | | | |
|---|---|---|---|
| 2016/0098450 A1* | 4/2016 | Tandon | G06F 16/2455 |
| | | | 707/718 |
| 2016/0155141 A1* | 6/2016 | Song | G06Q 30/0242 |
| | | | 705/14.41 |
| 2017/0286485 A1* | 10/2017 | Chandramouli | G06F 16/245 |
| 2018/0293493 A1* | 10/2018 | Kalamkar | G06N 3/08 |
| 2018/0300939 A1* | 10/2018 | Benthin | G06T 15/06 |

* cited by examiner

| Accelerator | Channel 1 | Channel 2 | Channel 3 | Channel 4 | Channel 5 | Channel 6 | Channel 7 | Channel 8 |
|---|---|---|---|---|---|---|---|---|
| 1 | 1 | 2 | 1 | 2 | 5 | 6 | 5 | 6 |
| 2 | 2 | 1 | 2 | 1 | 4 | 5 | 4 | 5 |
| 3 | 5 | 4 | 5 | 4 | 1 | 2 | 1 | 2 |
| 4 | 6 | 5 | 6 | 5 | 2 | 1 | 2 | 1 |

TECHNIQUES FOR REDUCING ACCELERATOR-MEMORY ACCESS COSTS IN PLATFORMS WITH MULTIPLE MEMORY CHANNELS

BACKGROUND

Data analytics and "Big Data" processing have become increasingly important in recent years. Data analytics and Big Data workloads require processing huge amounts of data. One approach for processing such huge amounts of data is to distribute the processing tasks across large numbers of servers and process the workload in parallel. For example, the Apache Hadoop software framework enables tasks to be distributed across large numbers of commodity servers and process workloads using MapReduce. While Hadoop and MapReduce provide excellent scalability, they require a tremendous amount of inter-server communication (when implemented at large scale), and do not efficiently use processor and memory resources.

Some compute and memory-bandwidth intensive workloads such as used for data analytics and Big Data are hard to get the required level of performance with processor cores. To address this, so-called "accelerators" have been developed. Accelerators were initially implemented as components that were coupled to CPUs (central processing units) and managed as an IO (input-output) device with its own address space, which requires significant levels of IO communication to transfer data between the accelerator address space and applications running in system memory address space. Recently, CPUs employing System on a Chip (SoC) architectures with embedded accelerators have been introduced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
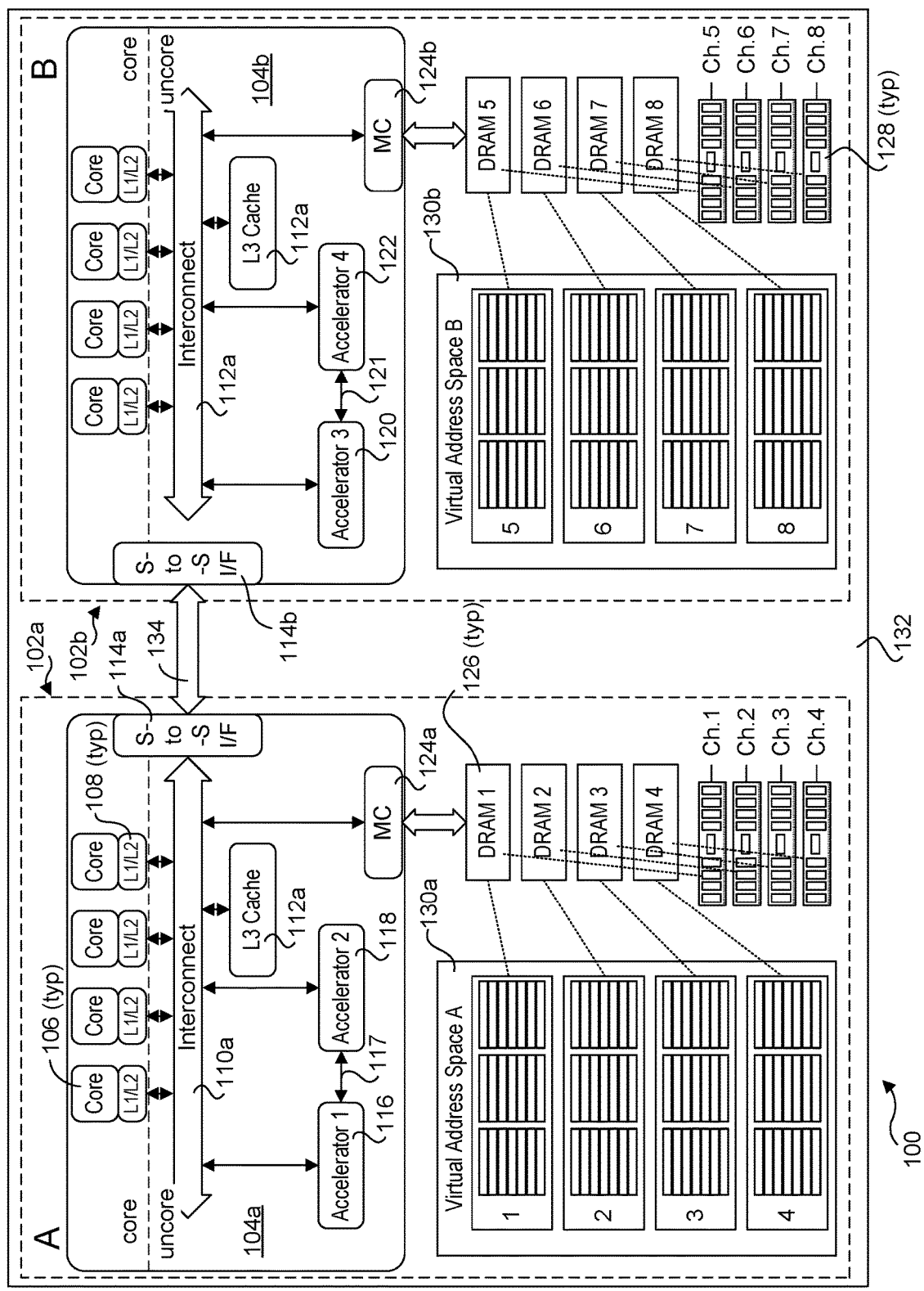
FIG. 1 is a schematic diagram of a first multi-socket non-uniform memory access (NUMA) platform architecture including a pair of processors having two on-chip accelerators.

Embodiments of methods and apparatus for r educing accelerator-memory access costs in platforms with multiple memory channels are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Workloads such as data analytics and Big Data processing tend to require processing huge amounts of data from memory and pose interesting challenges for the design of efficient accelerators. Accelerators have steadily improved in capability with one of the most significant recent trends being "shared virtual memory" (SVM) capable accelerators. The traditional accelerator needed to be managed as an IO (input-output) device in its own personal address space; this was accomplished with expensive kernel-mode drivers (KMD) that needed applications to cross back and forth between user and kernel-space, pinning pages in memory or copying user buffers to/from special buffers managed by the OS/Kernel-mode-driver. With SVM, the accelerator or IO device can directly work on the address space of a user application thread, as it shares the same virtual→physical address translation capabilities as the CPU (central processing unit, aka processor) thread. This is a key improvement in accelerator efficiency and amongst other performance benefits, enables user-mode submissions directly to the accelerators, via a "user-mode-driver" or UMD.

However, for applications that need many acceleration engines to operate in a data-streaming manner at very high bandwidths, SVM also poses some challenges. When an application assigns a job to an accelerator, it allocates input data buffers and output data buffers to the accelerator in virtual memory space. When multiple accelerators are used in a multi-socket platform, these input and output data buffers may comprise physical memory pages that are scattered across the memories of different sockets, and across the many memory channels (e.g., 6 to 8) within each socket. As these accelerators operate as high bandwidth streaming engines, depending on which engine works on the job can cause a huge difference in performance and the amount of data that flows through all the internal fabrics of the CPU SoC (System on a Chip), as well as inter-socket links.

This problem is exacerbated under a multi-socket Non-Uniform Memory Access (NUMA) architecture, such as shown by NUMA architecture 100 in FIG. 1. NUMA architecture 100 includes two NUMA nodes 102a and 102b, also labeled 'A' and 'B'. For simplicity and convenience, reference to nodes herein may be to their letter label rather than their reference number. In addition, reference to a component that is common across nodes will be made to the base reference number, while a letter 'a', 'b', will be added to the reference number in the drawing Figures to identify that component on a particular NUMA node. For example, each of nodes A and B include a processor 104, which is labeled 104a for the processor for node A and 104b for the processor for node B.

Each processor 104 has a core portion including a plurality of processor cores 106, each including a local level 1 (L1) and level 2 (L2) cache (depicted as L1/L2 cache 108). The remaining portion of the processor is referred to as the uncore, and includes various interconnect circuitry and interfaces for connecting various functional blocks on the processor in communication. For simplicity this interconnect circuitry is depicted as an interconnect 110; however, it will be understood that interconnect 110 may be representative of one or more interconnect structures, such as buses and single or multi-lane serial point-to-point or mesh interconnect structures. Moreover, the interconnect structure may be implemented in a hierarchy and/or employ different protocols and structures using bridges between to interface the different protocols and structures.

Several components are coupled to interconnect 110, includes a level 3 (L3) cache 112 (also referred to as a Last Level Cache or LLC), a socket-to-socket interface 114, a pair of accelerators, as depicted by accelerators 116, 118, 120, and 122 (also depicted and referred to a Accelerator 1, Accelerator 2, Accelerator 3, and Accelerator 4), and a memory controller (MC) 124. Accelerator 1 and 2 are further connected by a link 117, and accelerators 120 and 122 are further connected by a link 119. In one embodiment, one or both accelerators comprise Field Programmable Gate Arrays (FPGAs) including programmable circuitry embedded on the processor die. An accelerator may also comprise predefined circuitry embedded on the processor die. In addition to these illustrated components, each processor 104 would include many other functional blocks that are not shown for clarity.

Each of memory controllers 124a and 124b includes one or more channels connected to one or more DRAM (Dynamic Random Access Memory) memory devices 126, such as Dual In-line Memory Modules (DIMMs) 128. In FIG. 1, these DRAM memory devices are depicted as DRAM 1-4 for node A and DRAM 5-8 for node B. In the illustrated embodiment, a respective memory channel is connected to each DRAM memory device 126, as indicated by Ch. 1, Ch. 2, Ch. 3, etc., where "Ch." means channel. However, this is merely exemplary, as a memory controller may have more than one memory channel connected to the same memory device.

Each of DRAM memory devices 126 has a physical address space. Generally, the physical address space is partitioned into units of "pages," which are further partitioned into units of cachelines, although other addressing scheme may be used. The physical address spaces of the DRAM memory devices is mapped to a virtual address space, as shown by virtual address spaces 128a and 128b. The virtual address space is usually partitioned into a plurality of virtual memory "pages," and accessed at the page level. Mapping between the virtual and physical address spaces is generally handled by the memory controller and/or other platform components (not shown). The operating system may provide further aspects of this mapping, depending on the particular platform.

In one embodiment, each of processors 104 is operatively coupled to a printed circuit board called main board 132 via a socket, or otherwise coupled to the main board via a direct coupling technique, such as flip-chip bonding. In either case, it is common practice to refer to the processors themselves as sockets, and thus the usage of the terminology socket-to-socket links and interfaces for coupling processor nodes in communication. Main board 132 includes electrical wiring (e.g., traces and vias) to facilitate electrical connections corresponding to the physical structure of various interconnects depicted in FIG. 1. These interconnects include a socket-to-socket link 134 coupled between socket-to-socket interfaces 114a and 114b. In one embodiment, socket-to-socket interfaces 114a and 114b employ the INTEL® Quickpath Interconnect (QPI)® protocol and wiring structure (also referred to as INTEL® Universal Path Interconnect). As used herein, the socket-to-socket link is also referred to as an inter-socket link.

Under a NUMA architecture, processors (and processor cores) are enabled to access different memory resources distributed across the platform. The memory resources may be considered local memory resources (e.g., memory resources on the same node as a processor or core) or non-local memory resources (e.g., memory resources on other nodes). For example, under the viewpoint of node 102a, each of DRAMs 1-4 comprises a local memory resource, each of DRAMs 5-8 comprises a non-local memory resource. Under another type of NUMA architecture (not depicted herein), non-local memory resources may also be shared between processors while not being associated with a particular processor or node. Since, for a given node, local memory resources are operatively coupled to a processor, while non-local memory resources are not, the access to the local memory resources relative to the non-local memory resources is not the same (e.g., the access is non-uniform). Moreover, it is preferable to employ local memory resources when available.

Under NUMA architecture 100, software running on a processor core in one node may be allocated a memory address space in system memory nominally associated with another node. Accordingly, under some embodiments the address space for a portion of the memory resources for a platform may be managed as a single global pool, with unique addresses for each memory address location within the pool. Additionally, a portion of the address space may be considered local address space that employs local addressing (e.g., address space allocated to an operating system), while another portion may be addressed using global addressing.

In addition to accelerators being on-chip (meaning on a processor SoC as part of SoC die), accelerators may be separate off-chip components that are coupled in communication with a processor. An example of this is shown by NUMA architecture 200 in FIG. 2, which includes nodes 202a and 202b with respective processors 204a and 204b. Components in NUMA architectures 100 and 200 having similar reference numbers are similar in both embodiments. In addition, it will be understood that NUMA architecture 200 employs a similar virtual memory mapping scheme as NUMA architecture 100 (not shown in FIG. 2 due to lack of space).

To facilitate communication between processor cores, accelerators, and memory, a processor will have one or more input-output (IO) interfaces. Under the illustrated embodiment, the IO interfaces are implemented using Peripheral Component Interconnect Express (PCIe) components, which are depicted as PCIe Root Complexes 202a and 202b and PCIe interfaces 204, 206, 208, and 210. On node 102a, PCIe interface 204 is coupled to an accelerator 212 via a PCIe link 214, while PCIe interface 206 is coupled to an accelerator 216 via a PCIe link 218. On node 102b, PCIe interface 208 is coupled to an accelerator 2220 via a PCIe link 222, while PCIe interface 210 is coupled to an accelerator 224 via a PCIe link 226. PCIe supports various lane widths and speeds, including 1x, 2x, 4x, 8x, and 16x configurations, wherein 'x' represents the number of lanes. Both existing and future PCIe links and interfaces may be used for the PCIe links and interfaces shown FIG. 2 and discussed herein.

Generally, an off-chip accelerator may comprise a chip (e.g., an FPGA chip) that is mounted to the main board, or may reside on an accelerator board or card that is installed in a PCIe expansion slot. It is also possible to have multiple accelerator chips on the same board or card.

In addition to PCIe IO infrastructure, other IO technologies may be employed in a similar manner. These include, but are not limited to INTEL® Corporation OmniPath and QuickPath Interconnect, Open System Interconnection protocol, and Advanced Micro controller Bus Architecture (AMBA) bus protocols. Further examples of IO infrastructure that may be implemented is described with reference to FIG. 8 below.

Under aspects of the embodiment described herein, the workload for streaming accelerator jobs is spread across a number of accelerators spread across multiple sockets, and in many places within each socket (e.g., many locations in the CPU die, and/or on attached MCP (MultiProcessor Computing) dies). When a new job is submitted, accelerators with available instances of the function used to perform one or more tasks are identified. The memory channels used to access memory buffers to be used for the job are also identified, and an aggregate cost to access the memory buffers via the memory channels is calculated for each accelerator with an available instance of the function. The accelerator with the lowest aggregate cost is then selected to be used for the function.

Figure 3:
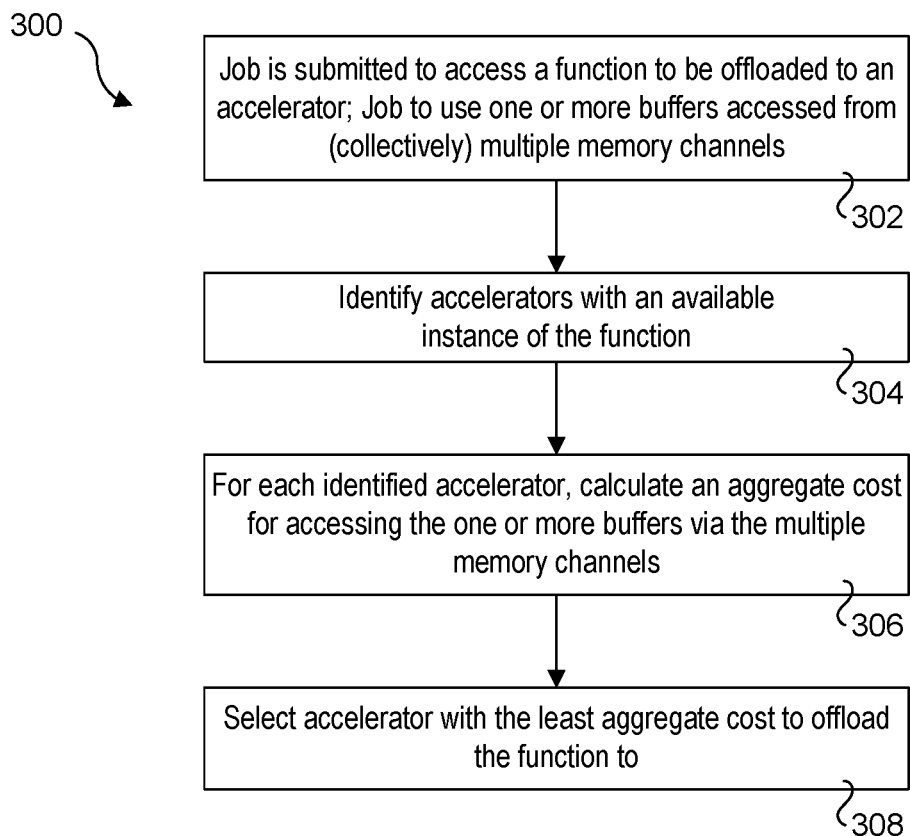
FIG. 3 is a flowchart illustrating an overview of operations performed to select an accelerator to be used to offload a function, according to one embodiment.

An overview of one embodiment of the process for selecting an accelerator to perform and offloaded function is shown in a flowchart 300 of FIG. 3. In a block 302, a job is submitted to access a function to be offloaded to an accelerator. As described in further detail below, in one embodiment the job is submitted via a driver and includes information identifying one or more buffers to be used by the function. Depending on the allocation of memory pages for the buffers (e.g., by an operating system running on the platform), access to the one or more buffers may require use of multiple memory channels.

In a block 304, accelerators with an available instance of the function are identified. As shown in a block 306, for each of the accelerators that are identified to have an available instance of the function, an aggregated cost is calculated for accessing the one or more buffers via the multiple memory channels. The process is completed in a block 308, where the accelerator with the least aggregate cost is selected to offload the function to.

Figure 4:
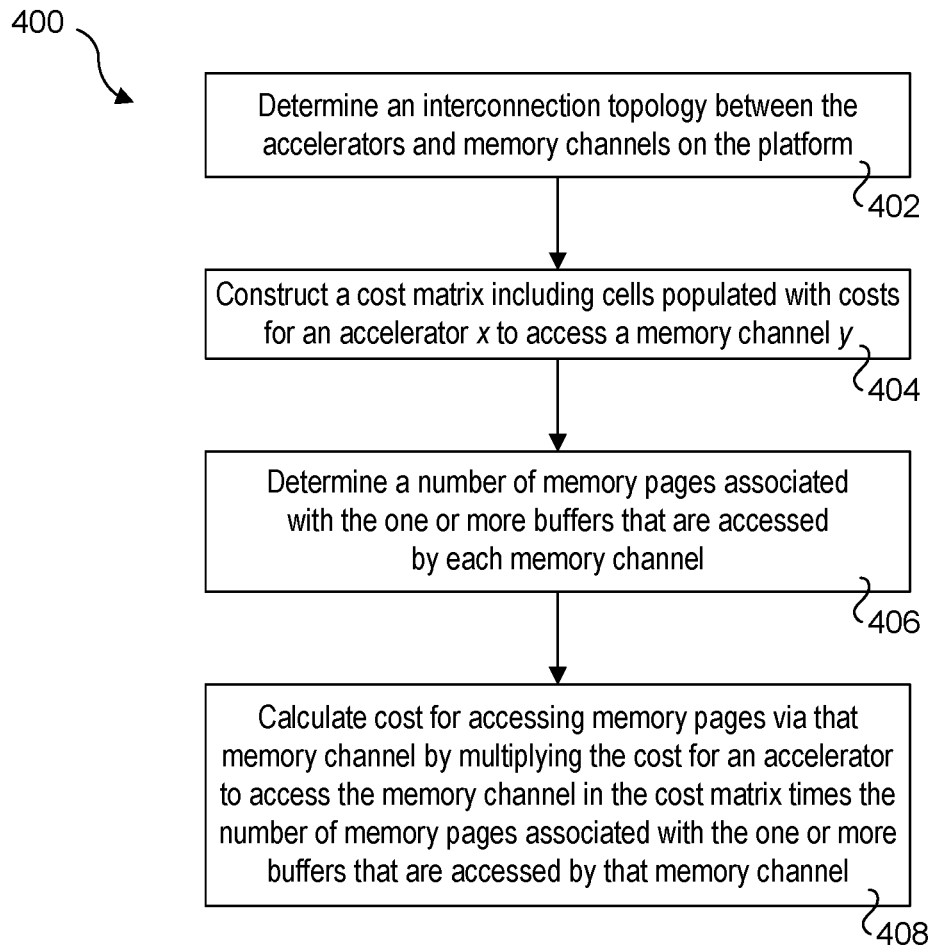
FIG. 4 is a flowchart illustrating operations used to determine an aggregate cost for accessing one or more buffers from accelerators on the platform having an available instance of the function to be offloaded.

Further operations to implement one embodiment of the process are shown in a flowchart 400 of FIG. 4. In a block 402, an interconnection topology between the accelerators and the memory channels on the platform is determined. In one embodiment, during an initialization phase when the accelerator devices are being discovered and enumerated, they also record their "location" given the topology of the system with respect to the memory sub-system. In conjunction with this initialization phase, a cost matrix is constructed where the rows are the different accelerator instances, and the columns are the memory channels in the system. Each cell in the matrix is populated with a "cost" for an engine (e.g., an accelerator) x to read/write (i.e., access) data to a channel y. Generally, we can expect that the NUMA remote channels will be assigned higher costs than local channels (for a given instance). The construction of the cost matrix is shown in a block 404.

In a block 406, the number of memory pages associated with the one or more buffers that are accessed by each memory channel are determined. A cost for accessing the memory pages via that memory channel is then calculated in a block 408 by multiplying the cost for an accelerator to access the memory channel (in the cost matrix) times the number of memory pages associated with the one or more memory buffers that are accessed via that memory channel.

In one embodiment, When a CPU thread submits a job to the accelerator pool, the driver (which can be user-mode) performs its usual checks for available instances, but also computes a cost for each available instance based on the cost-matrix. This is done by obtaining a list of physical pages for each of the data buffers in the command descriptor and their memory channels and summing them to get a list of the number of pages of each channel that will be referenced by this job (call this L). In one embodiment, this is facilitated by a new Instruction Set Architecture (ISA) instruction for the processor, as described below. For each available engine (e.g., accelerator), the row from the cost-matrix Ri is selected, and the dot-product of Ri*L is computed. The engine that has the smallest dot-product cost is then picked to be used with the CPU thread.

Constructing a Cost Matrix

As discussed above, in one embodiment a cost matrix is used that defines cost for using various combinations of accelerators and memory channels. To build the matrix, a cost is assigned from each accelerator instance to each memory channel in the system. This will generally be a function of the topology of the platform, as discussed in further detail below. In one embodiment, cost will look at the interconnection latencies from the accelerator to the channel, as well as factor in precious resources on the way (e.g., crossing a congested inter-socket link, or accessing an intermediate node that may be sharing bandwidth with another precious resource such as a PCIe link or Network Interface Controller (NIC)). Generally, various types of heuristics can be used to calculate the costs, but the simple idea is to assign costs to different aspects of the system bandwidth that will be impacted when a memory reference is made from the accelerator to this memory channel.

Figures 5, 6:
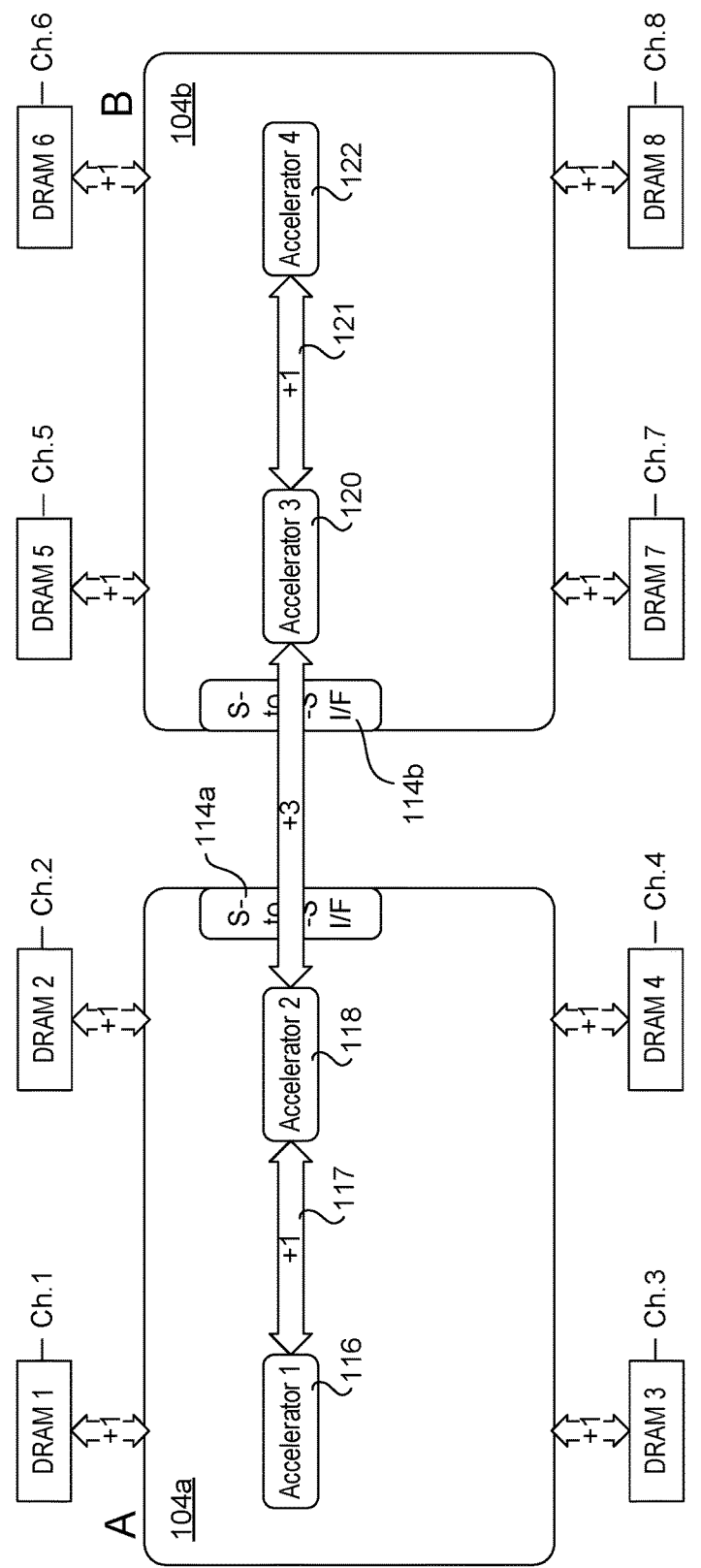
FIG. 5 is an exemplary cost matrix.
FIG. 6 is a simplified NUMA platform architecture showing various costs for accessing corresponding components including accelerators and memory devices.

FIG. 5 shows an example of a cost matrix 500 for a simplified platform architecture 600 with 4 accelerators and 8 channels shown in FIG. 6. Essentially, platform architecture 600 includes selected components of NUMA architecture 100, with a cost associated with each link or aggregation of links between the components. For simplicity the costs are shown as integer values, such as +1 and +3; in practice, the costs will generally comprise more variation and may be dependent on multiple factors, including other traffic over shared links, which can only be evaluated during actual run-time operations and/or through heuristic analysis of bandwidth measurements between communicating components under different workloads.

New ISA Instruction Get_phys_mem_from_VA

LISTING 1 shows pseudocode for implementing a new instruction called Get_phys_mem_from_VA that would be added to the Instruction Set Architecture (ISA) of the processors illustrated herein.

```
                           LISTING 1
1    Get_phys_mem_from_VA m64 dest, m64 src, r64 len{
2    // assume min Page-size of 4K
3        For (i=0; i< len; i+= 4K){
4            PA = lookup-TLB-for-virtual-address(src[i]);
5            Get-physical-memory-attributes(PA); // in our case,
6                                         // just channel info
7            Dest[i/4K].PA = PA;
8            Dest[i/4K].channel = channel # from Memory controller
9        }
10   }
```

Basically the Get_phys_mem_from_VA instruction takes in a data buffer in virtual space and provides the list of physical pages (addresses and associated information such as exact mem-channel/controller) for it. The instruction includes three parameters (operands) dest, src, and len, which are respective stored in first and second m64 64-bit registers and an r64 64-bit register. m64 notation means that the operand is a pointer to memory so that content will be used in a load/store instruction. r64 notation means the operand is used as data value. len is the length of the data buffer in bytes and src contains a 64-bit pointer to the data buffer. In a C-like notation, src[i] will be the address of the ith byte of src (also the same as src+i). The core hardware will perform the function lookup-TLB-for-virtual-address so we can get a physical address that corresponds to the virtual page for byte src[i]. The loop increments i by 4K (i.e., the page size) because the bytes in between will either map to the current page or the one 4K away.

The m64 dest registers contains a pointer to a memory buffer to contain an array of structs (dest[i/4K]) whose fields will be {PA (physical address), Channel#, . . . other attributes}. The Get-physical-memory-attributes(PA) is a hardware circuit in the processor similar to the TLB lookup structures/logic that takes the physical address and broadcasts it like a dummy "load", but the uncore/memory controller drops the "load" and simply return the ID of which one would have serviced it if it was a real load.

Job Submission

Suppose we have a function to add 2 arrays of numbers that is offloaded to an accelerator. The descriptor would have 2 input buffers of some size S, and an output buffer of size S. This is a very simple example, whereas real usages would have many combinations of input/output buffers each with its own size.

When the job is submitted to the driver, the driver code examines the descriptor and finds a list of available instances for the function. It also calls the foregoing Get_phys_mem_from_VA instruction to get a per-buffer list of channels used. Note Get_phys_mem_from_VA instruction will be called 3 times, ignoring the PA results, since we are only interested in getting the channel# at this point. For instance, we get a channel-table like shown in TABLE 1:

TABLE 1

| Buffer# | Pg1 | Pg2 | Pg3 |
|---|---|---|---|
| Src-1 | 1 | 2 | 5 |
| Src-2 | 6 | 8 | — |
| Dest | 3 | 4 | 6 |

Note that while the 2 source buffers are of the same size S (e.g. 8 KB), they can use up 2 or 3 pages, depending on the address alignment.

In TABLE 1, we know which channel each page uses, but we need to find an aggregate of channel usage by adding up across the buffers. An exemplary aggregate of channel usage is shown in TABLE 2:

TABLE 2

| Ch1 | Ch2 | Ch3 | Ch4 | Ch5 | Ch6 | Ch7 | Ch8 |
|---|---|---|---|---|---|---|---|
| 1 | 1 | 1 | 1 | 1 | 2 | 0 | 1 |

Continuing with this example, suppose that accelerators 1 and 4 are available. The cost is computed for each is shown in TABLE 3 and TABLE 4, respectively, wherein the cost for a given channel is determined by multiplying the channel usage for that channel across buffers and multiplying it times the accelerator's cost matrix row values from FIG. 5:

TABLE 3

|  | Ch1 | Ch2 | Ch3 | Ch4 | Ch5 | Ch6 | Ch7 | Ch8 |
|---|---|---|---|---|---|---|---|---|
|  | 1 | 1 | 1 | 1 | 1 | 2 | 0 | 1 |
| Acc1 | 1 | 2 | 1 | 2 | 5 | 6 | 5 | 6 |
| Cost | 1 | 2 | 1 | 2 | 5 | 12 | 0 | 6 |
| Total |  |  |  |  |  |  |  | 29 |

TABLE 4

|  | Ch1 | Ch2 | Ch3 | Ch4 | Ch5 | Ch6 | Ch7 | Ch8 |
|---|---|---|---|---|---|---|---|---|
|  | 1 | 1 | 1 | 1 | 1 | 2 | 0 | 1 |
| Acc4 | 6 | 5 | 6 | 5 | 2 | 1 | 2 | 1 |
| Cost | 6 | 5 | 6 | 5 | 2 | 2 | 0 | 1 |
| Total |  |  |  |  |  |  |  | 27 |

The driver will pick accelerator 4, since its cost (27) is less that the cost (29) for accelerator 1.

Variations

Systems without SVM

This type of scheme can be done even in traditional CPU systems where the IO devices have a physical address space. For efficiency, to serve those usages define a slightly different instruction Get_phys_mem_v1 that provides a mapping from physical address to channels. One embodiment of this instruction is shown in LISTING 2:

```
                           LISTING 2
1    Get_phys_mem_v1 m64 dest, m64 src, r64 len{
2    // assume min Page-size of 4K
3        For (i=0; i< len; i+= 4K){
```

-continued

LISTING 2

```
4        Get-physical-memory-attributes(src[i]); // in our case,
5            // just channel info
6        Dest[i/4K].channel = channel # from Memory controller
7    }
8  }
```

Sometimes, the buffer is represented as a set of physical pages rather than a virtual memory address and a length. In this instance, the Get_phys_mem_v2 instruction in LISTING 3 may be used:

LISTING 3

```
1  Get_phys_mem_v2 m64 dest, m64 src, r64 number{
2    // assume min Page-size of 4K
3    For (i=0; i< number; i++){
4        Get-physical-memory-attributes(*src[i]); // in our case,
5            // just channel info
6        Dest[i].channel = channel # from Memory controller
7    }
8  }
```

For Get_phys_mem_v2, the src parameter is now a pointer to a data structure including a set of one or more physical (memory) pages used by the buffer, while the number parameter, which corresponds to the number of physical pages in the set of physical pages as replaced the length (len) of the buffer.

System where memory allocator does this during malloc( ):

During memory allocation, the user application can request that a buffer have an affinity to some memory channel(s). An improved malloc call can then optimize for this when the buffer is created, helping make the submission/mapping process more efficient.

Dynamic Cost Functions:

The scheme can be extended where we do not have a static cost matrix, but one that changes with system load and possibly with QOS (Quality of Service) considerations. Under one embodiment, memory bandwidth and latency on the memory controller channels are monitored, as well as the socket-to-socket interconnect links. Periodically, the cost-matrix can be adjusted based on heavily-used regions. More generally, the cost-matrix can be updated by monitoring the memory bandwidth and latency on the memory channels and applying heuristic analysis of the observed information.

Complex Functions:

The schemes can be extended to usages like compression where size is unknown before-hand. In that case, we rely on the software framework, making reasonable guesses for the input and output buffer sizes. In general, the guess won't be perfect—e.g., when we compress a buffer of size 128 KB, we can allocate an output buffer of size 64 KB, forecasting that at least a 2:1 compaction ratio will be achieved. However, sometime we may get a 4:1 ratio and only use the first 32 KB. The mapping won't be ideal in this case. To improve such systems, the driver can note that for compression-like workloads, there is a provided buffer size, but that there is a more typical size of what actually gets used (this can be tracked by the driver without application intervention) and that can be used for the cost calculation.

In one embodiment, each of the foregoing Get_phys_mem_v2, Get_phys_mem_v1 and Get_phys_mem_v2 instructions may be implemented in processors employing an x86 ISA (i.e., a processor employ an INTEL® x86-based microarchitecture). However, this is merely exemplary and non-limiting, as variants of the foregoing instructions may be implemented on various processor architectures. For example, consider the RISC-style Arm processor. The ARM instructions are generally capable of 3 operands. They have integer scalar instructions that work on general-purpose registers (GPRs) (e.g., 16 or 32 registers), and vector/floating-point instructions that work on 128-bit SIMD (called Neon) registers.

Figure 7:
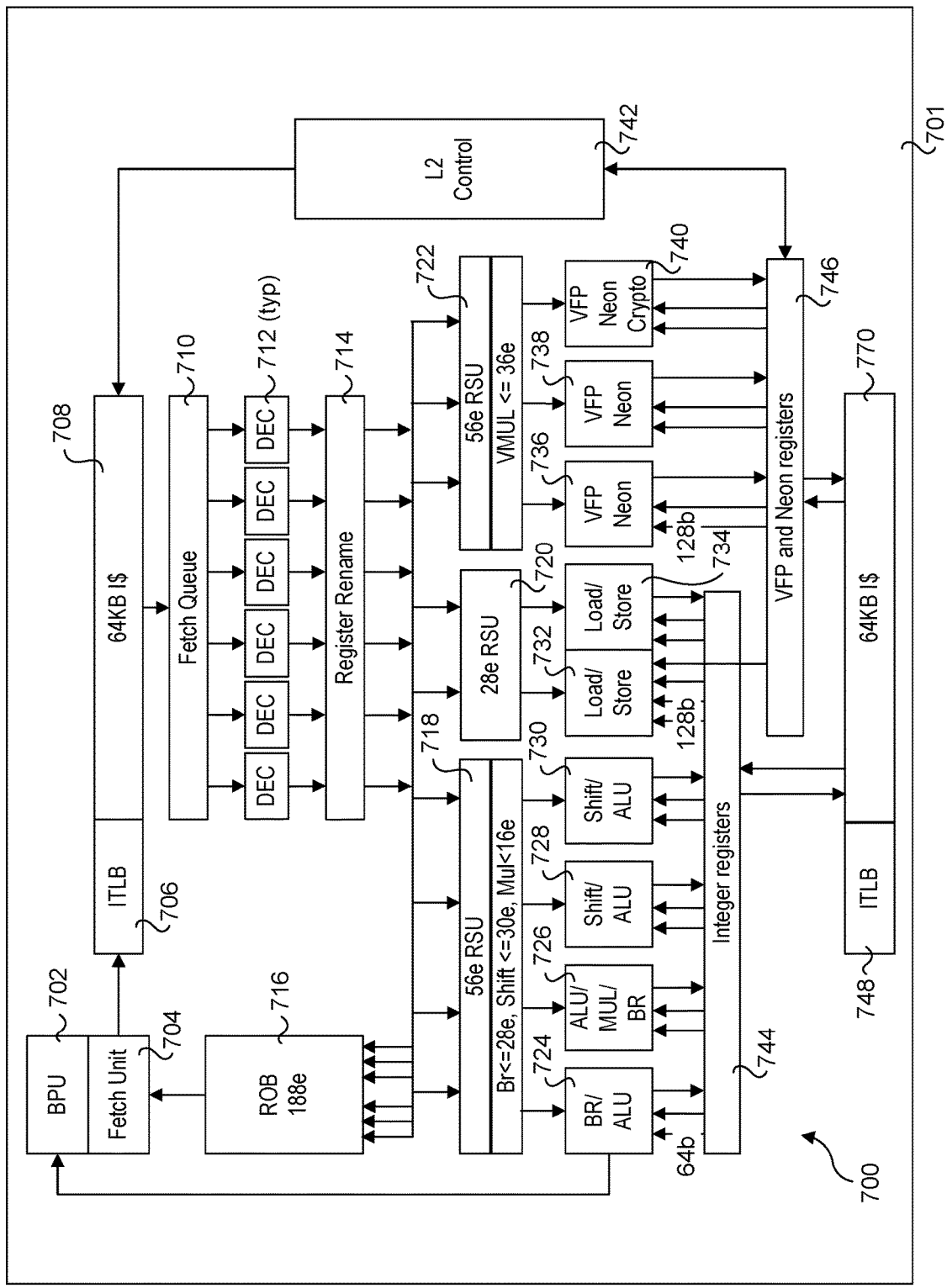
FIG. 7 is a schematic block diagram illustrating an example of an Arm-based microarchitecture suitable for implementing the Instruction Set Architecture (ISA) instructions disclosed herein.

An example of one embodiment of an Arm processor microarchitecture 700, is shown in FIG. 7. Microarchitecture 700 includes a branch prediction unit (BPU) 702, a fetch unit 704, an instruction translation look-aside buffer (ITLB) 706, a 64 KB (Kilobyte) instruction store 708, a fetch queue 710, a plurality of decoders (DECs) 712, a register rename block 714, a reorder buffer (ROB) 716, reservation station units (RSUs) 718, 720, and 722, a branch arithmetic logic unit (BR/ALU) 724, an ALU/MUL (Multiplier)/BR 726, shift/ALUs 728 and 730, and load/store blocks 732 and 734. Microarchitecture 700 further includes vector/floating-point (VFP) Neon blocks 736 and 738, and VFP Neon cryptographic block 740, an L2 control block 742, integer registers 744, 128-bit VFP and Neon registers 746, an ITLB 748, and a 64 KB instruction store 750.

Generally, the each of the foregoing Get_phys_mem_v2, Get_phys_mem_v1 and Get_phys_mem_v2 instructions described herein may be implement using embedded logic (e.g., via circuitry), microcode, or a combination of the two. Under an Arm microarchitecture, general-purpose registers may be used for the 64-bit m64 and r64 operands.

Figure 2:
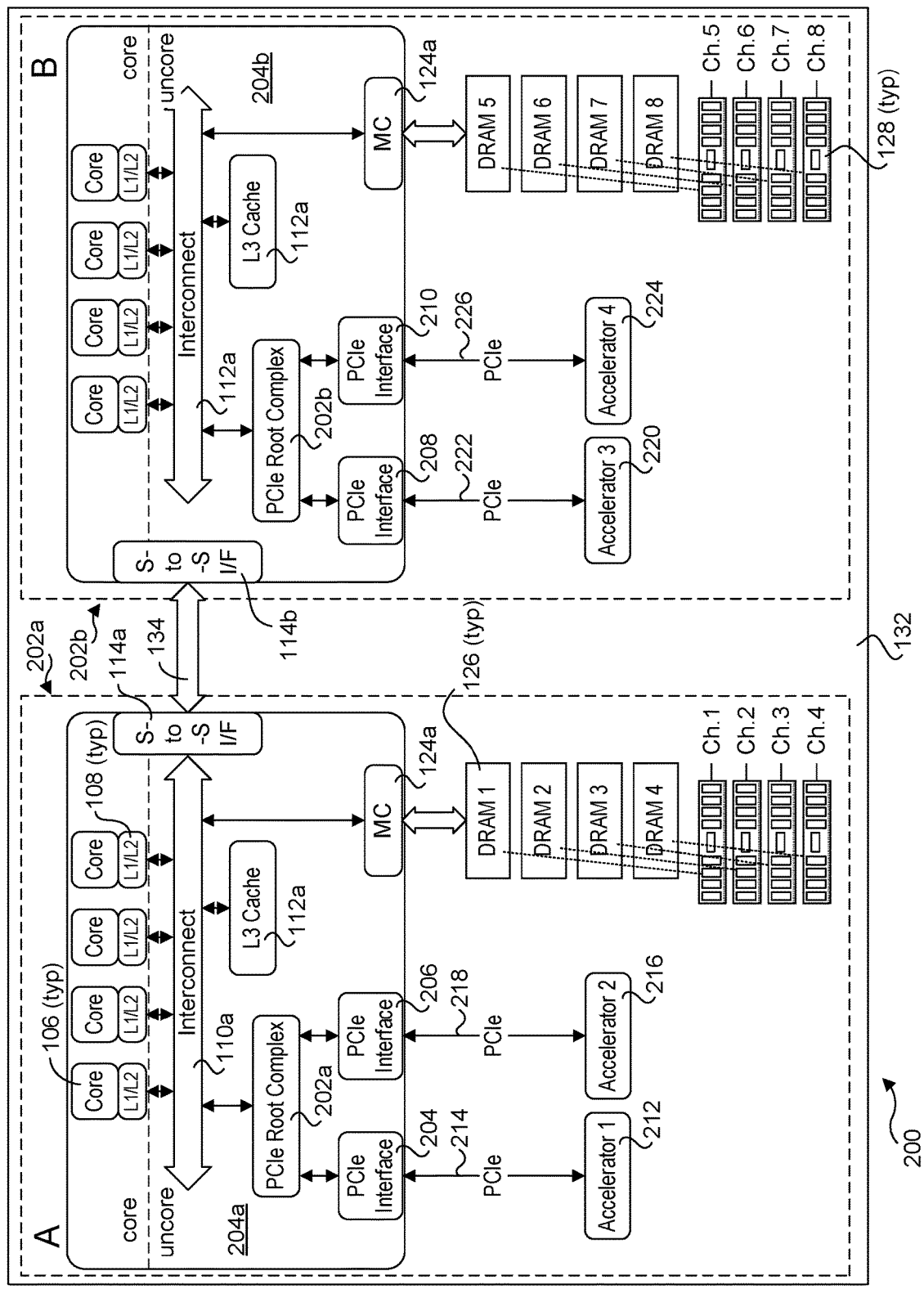
FIG. 2 is a schematic diagram of a second multi-socket NUMA platform architecture, wherein each NUMA node includes a processor coupled to two off-chip accelerators.
Figure 8:
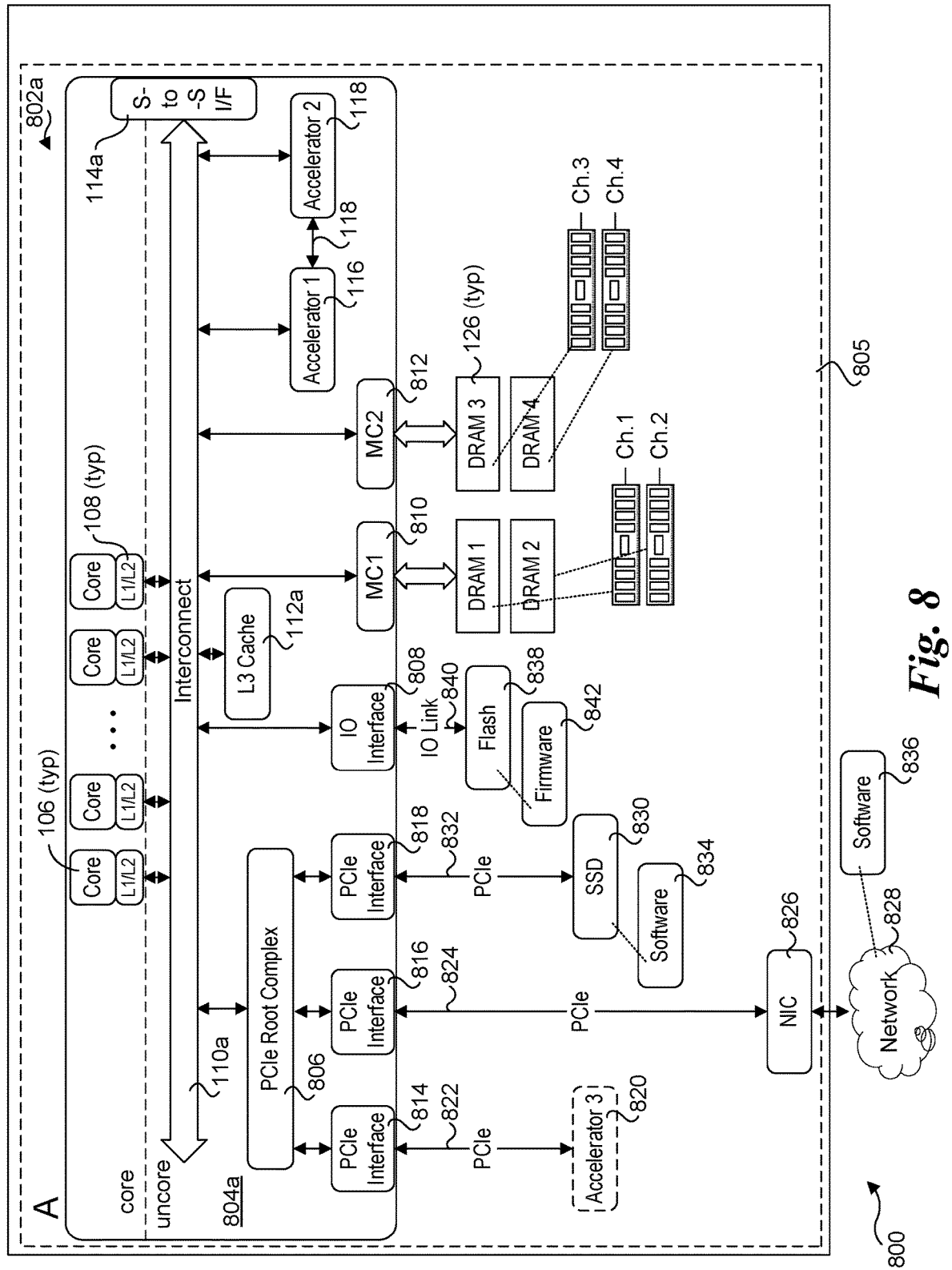
FIG. 8 is a schematic diagram illustrating further details of an exemplary NUMA node, according to one embodiment.

Due to space limitations, the NUMA nodes in FIGS. 1 and 2 are shown in simplified form. FIG. 8 shows a NUMA platform architecture 800 showing further details of a NUMA node 802a employing a processor 804 that includes further components that generally may be included in NUMA nodes 102 and 202 of FIGS. 1 and 2. NUMA node 802a includes a processor 804a mounted to a main board 805. As before, processor 804a includes a core comprising a plurality of cores 106 coupled to L1/L2 caches 108, which in turn are coupled to interconnect 110a. Also connected to interconnect 110a are a PCIe root complex 806, and L3 cache 112a, accelerators 116 and 118, an IO interface 808, and memory controllers 810 and 812 (also labeled MC1 and MC2).

PCIe root complex 806 will generally be coupled to one or more PCIe interfaces, as depicted by PCIe interfaces 814, 816, and 818. Generally, all or a portion of the PCIe interfaces and PCIe links may be connected to PCIe expansion slots (not shown) mounted on main board 805. PCIe interface 814 is depicted as being connected to an optional of-chip accelerator 820 via a PCIe link 822. As discussed above, an off-chip accelerator may comprise an accelerator chip or the like that is either mounted to the platform's main board or installed on an accelerator board or card mounted in a PCIe expansion slot.

PCIe interface 816 is connected (via a PCIe link 824) to a NIC 826 that provides access to a network 828. Generally, NIC 826 is representative of various types of network interface adaptors and fabric adaptors, including but not limited to Ethernet adaptors, InfiniBand host controller adaptors (HCAs) and INTEL® OmniPath host fabric interfaces (HFIs).

PCIe interface 818 is connected to a solid state drive (SSD) 830 via a PCIe link 832. Optionally, other types of IO interfaces may be used to enable a processor to communicate with an SSD. As shown, system software 834 is stored on SSD 830. The system software may generally include an operating system and one or more application that run on the operating system. The system software may also support various types of virtualized embodiments, including virtualized platforms that implement Type-1 and Type-2 Hypervisors, as well as container-based virtualization environments. As further depicted by software 836, all or a portion of the system software may be loaded during platform boot over network 828.

IO interface 808 is connected to a firmware storage device, such as a flash device 838 via an IO link 840. Flash device 838 stores system firmware 842, which is loaded as part of the platform's initialization. Generally, various types of firmware may be used depending on the platform, including firmware that employs the Universal Extensible Firmware Interface (UEFI) architecture. All or a portion of the firmware may also be referred to as BIOS (Basic Input Output System), for historical reasons.

Generally, a processor may include one or more memory controllers, each having one or more memory channels connected to one or more memory devices, as discussed above. The embodiment of FIG. 8 includes two memory controllers 810 and 812. Memory controller 810 is coupled to memory devices DRAM 1 and DRAM 2 via respective memory channels 1 and 2. Memory controller 812 is coupled to memory devices DRAM 3 and DRAM 4 via respective memory channels 3 and 4.

As discussed above, in some embodiments the topology of the platform's interconnect structure is determined during initialization. For the PCIe components, this information is automatically determined during PCIe enumeration, and may be accessed via either a PCIe firmware or software driver. Similarly, various firmware and/or software drivers may be used to enumerate the various IO and memory interfaces on the platform, as well as other interconnect links, including any socket-to-socket links.

Further aspects of the subject matter described herein are set out in the following numbered clauses:

1. A method performed on a computing platform including a plurality of accelerators and a plurality of memory devices accessed by a plurality of memory channels, the method comprising:
in response to a job submission to access a function to be offloaded to an accelerator, the function to access one or more buffers, the one or more buffers collectively requiring access via multiple memory channels among the plurality of memory channels,
identifying accelerators with an available instance of the function;
calculating, for each identified accelerator, an aggregate cost for accessing the one or more buffers via the multiple memory channels; and
selecting the accelerator with the least aggregate cost to offload the function to.

2. The method of clause 1, wherein the computing platform is a multi-socket computing platform having a Non-Uniform Memory Access (NUMA) architecture including shared virtual memory (SVM) in which the one or more buffers are logically stored, and wherein at least a portion of the plurality of accelerators are SVM-capable accelerators.

3. The method of clause 1 or 2, further comprising:
determining an interconnection topology between the plurality of accelerators and the plurality of memory channels;
constructing, based on the interconnection topology, a cost matrix including a plurality of cells, wherein each cell is populated with a cost for an accelerator of the plurality of memory channels to access a memory channel of the plurality of memory channels; and
calculating the aggregate cost of for each of the accelerators that is identified using the cost matrix.

4. The method of clause 3, further comprising:
determining a number of memory pages associated with the one or more buffers that are accessed by each memory channel of the plurality of memory channels; and
calculating a cost for accessing memory pages via that memory channel by multiplying the cost for an accelerator to access the memory channel in the cost matrix with the number of memory pages associated with the one or more buffers that are accessed by that memory channel.

5. The method of clause 3, further comprising:
during ongoing run-time operations for the computing platform, updating one or more cells with an updated cost that is dynamically determined.

6. The method of clause 5, wherein the updated cost for at least one or the one or more cells for which a cost is updated is determined by monitoring bandwidth along one or more links in the interconnect topology and applying heuristics to update the cost based on the monitored bandwidth.

7. The method of any of the preceding clauses, further comprising:
identifying, for each of the one or more buffers, one or more memory pages allocated to that buffer;
identifying, for each of the one or more memory pages, a memory channel used to access that memory page; and
determining, for each of the accelerators, a respective cost to access a memory page via each of the memory channels,
wherein the aggregate cost for a given accelerator is determined by,
summing, for each memory page identified in (i), a cost for accessing that memory page by that accelerator.

8. The method of any of the preceding clauses, wherein the computing platform includes a processor that includes an instruction set architecture (ISA) having an instruction that is executed once for each of the one or more buffers to identify memory pages used by that buffer and a memory channel used to access each memory page.

9. The method of clause 8, wherein the instruction has a first operand to store a pointer to a data structure in a first register, a second operand to store an address of a buffer in a second register, and a third operand to store a length of the buffer or a number of memory pages spanned by the buffer in a third register, wherein the instruction is configured, upon execution, to populate the data structure with data identifying, for each of the one or more memory pages, a memory channel used to access that memory page.

10. The method of clause 8, wherein the processor employs an ARM-based architecture.

11. A multi-socket computing platform having a Non-Uniform Memory Access (NUMA) Architecture, comprising:
a plurality of NUMA nodes, each including,
a processor comprising a plurality of components including,
a plurality of processor cores;
at least one memory controller having a plurality of memory channels;
a socket-to-socket interface;
at least one accelerator; and
internal interconnection circuitry coupling the plurality of components in communication;
a plurality of memory devices, communicatively coupled to plurality of memory channels on the processor; and socket-to-socket interconnection circuitry to enable communication between pairs of processors;

wherein, upon operation the multi-socket computing platform is configured to, in response to a job submission via software running on the multi-socket computing platform to access a function to be offloaded to an accelerator, the function to access one or more buffers, the one or more buffers collectively requiring access via multiple memory channels among the plurality of memory channels, identify accelerators with an available instance of the function;

calculate, for each identified accelerator, an aggregated cost for accessing the one or more buffers that are identified via the multiple memory channels; and select the accelerator with the least aggregate cost to offload the function to.

12. The multi-socket computing platform of clause 11, wherein the (NUMA) architecture includes shared virtual memory (SVM) in which the one or more buffers are logically stored, and wherein at least a portion of the plurality of accelerators are SVM-capable accelerators.

13. The multi-socket computing platform of clause 11 or 12, wherein, upon operation, the multi-socket computing platform is further configured to:

determine an interconnection topology between each of the plurality of accelerators and each of the plurality of memory channels;

construct, based on the interconnection topology, a cost matrix including a plurality of cells, wherein each cell is populated with a cost for an accelerator of the plurality of accelerators to access a memory channel of the plurality of memory channels; and calculate the aggregate cost of for each of the identified accelerators using the cost matrix.

14. The multi-socket computing platform of clause 13, wherein, upon operation, the multi-socket computing platform is further configured to:

determine a number of memory pages associated with the one or more buffers that are accessed by each memory channel of the plurality of memory channels; and calculate a cost for accessing memory pages via that memory channel by multiplying the cost for a corresponding accelerator to access the memory channel in the cost matrix with the number of memory pages associated with the one or more buffers that are accessed by that memory channel.

15. The multi-socket computing platform of clause 13, wherein, upon operation, the multi-socket computing platform is further configured to:

during ongoing run-time operations for the computing platform, update one or more cells with an updated cost that is dynamically determined.

16. The multi-socket computing platform of clause 15, wherein the updated cost for at least one or the one or more cells for which a cost is updated is determined by monitoring bandwidth along one or more links in the interconnect topology and applying heuristics to update the cost based on the monitored bandwidth.

17. The multi-socket computing platform of any of clauses 11-16, wherein, upon operation, the multi-socket computing platform is further configured to:

identify, for each of the one or more buffers, one or more memory pages allocated to that buffer;

identify, for each of the one or more memory pages, a memory channel used to access that memory page; and determine, for each of the accelerators, a respective cost to access a memory page via each of the memory channels, wherein the aggregate cost for a given accelerator is determined by summing, for each memory page identified in (i), a cost for accessing that memory page by that accelerator.

18. The multi-socket computing platform of any of clauses 11-17, wherein each processor includes an instruction set architecture (ISA) having an instruction that, upon execution, is enabled to identify memory pages used by a buffer and a memory channel used to access each memory page.

19. The multi-socket computing platform of clause 18, wherein the instruction has a first operand to store a pointer to a data structure in a first register, a second operand to store an address of a buffer in a second register, and a third operand to store a length of the buffer or a number of memory pages spanned by the buffer in a third register, wherein the instruction is configured, upon execution, to populate the data structure with data identifying, for each of the one or more memory pages, a memory channel used to access that memory page.

20. The multi-socket computing platform of clause 18, wherein the processor employs an ARM-based architecture.

21. A processor configured to be installed in a computing platform having a plurality of memory devices that are accessed by a plurality of memory channels and having an instruction set architecture (ISA) including an instruction having a first operand to store a pointer to a data structure in a first register, a second operand to store an address of a buffer spanning one or more memory pages in a second register, and a third operand to store a length of the buffer or a number of memory pages spanned by the buffer in a third register, wherein the instruction is configured, upon execution, to populate the data structure with data identifying, for each of the one or more memory pages, a memory channel used to access that memory page.

22. The processor of clause 21, wherein the computing platform employs a multi-socket Non-Uniform Memory Access (NUMA) architecture including multiple sockets, the processor further comprises at least one socket-to-socket interface, and wherein when the processor is installed in one of the multiple sockets the processor is communicatively coupled to a second processor via a socket-to-socket link.

23. The processor of clause 22, wherein multiple memory devices from among the plurality of memory devices are coupled to each of the processor and the second processor via a plurality of memory channels, and wherein the data structure, upon being populated via execution of the instruction, includes data identifying at least one memory channel for each of the processor and the second processor.

24. The processor of any of clauses 21-23, wherein the processor includes at least one accelerator comprising circuitry embedded on the processor.

25. The processor of any of clauses 21-24, wherein the address of the buffer is a virtual memory address.

26. The processor of clause 25, wherein the data structure further includes data identifying, for each of the one or more memory pages, a physical address of that memory page.

27. The processor of clause 25, wherein the processor further comprises a translation look-aside buffer (TLB), and the instruction, upon execution, accesses the TLB to lookup a physical address for each of the one or more memory pages.

28. The processor of any of clauses 21-27, wherein the first operand is stored in a first 64-bit register, the second operand is stored in a second 64-bit register, and the third operand is stored in a third 64-bit register, and wherein each of the first and second 64-bit registers are configured to store a pointer to memory to be used with a load/store instruction.

29. The processor of any of clauses 21-28, wherein the processor employs an Arm-based microarchitecture.

30. The processor of any of clauses 21-28, wherein the processor employs an Intel x86-based microarchitecture.

31. A multi-socket computing platform having a Non-Uniform Memory Access (NUMA) Architecture, comprising:
a plurality of NUMA nodes, each including,
a processor comprising a plurality of components including,
a plurality of processor cores;
at least one memory controller having a plurality of memory channels;
a socket-to-socket interface;
at least one accelerator; and
internal interconnection circuitry coupling the plurality of components in communication;
a plurality of memory devices, communicatively coupled to plurality of memory channels on the processor; and
socket-to-socket interconnection circuitry to enable communication between pairs of processors;
wherein the multi-socket computing platform further includes means for,
in response to a job submission via software running on the multi-socket computing platform to access a function to be offloaded to an accelerator, the function to access one or more buffers, the one or more buffers collectively requiring access via multiple memory channels among the plurality of memory channels,
identifying accelerators with an available instance of the function;
calculating, for each identified accelerator, an aggregated cost for accessing the one or more buffers that are identified via the multiple memory channels; and
selecting the accelerator with the least aggregate cost to offload the function to.

32. The multi-socket computing platform of clause 31, wherein the (NUMA) architecture includes shared virtual memory (SVM) in which the one or more buffers are logically stored, and wherein at least a portion of the plurality of accelerators are SVM-capable accelerators.

33. The multi-socket computing platform of clause 31 or 32, wherein the multi-socket computing platform further includes means for:
determining an interconnection topology between each of the plurality of accelerators and each of the plurality of memory channels;
constructing, based on the interconnection topology, a cost matrix including a plurality of cells, wherein each cell is populated with a cost for an accelerator of the plurality of accelerators to access a memory channel of the plurality of memory channels; and
calculating the aggregate cost of for each of the identified accelerators using the cost matrix.

34. The multi-socket computing platform of clause 33, wherein the multi-socket computing platform further includes means for:
determining a number of memory pages associated with the one or more buffers that are accessed by each memory channel of the plurality of memory channels; and
calculating a cost for accessing memory pages via that memory channel by multiplying the cost for a corresponding accelerator to access the memory channel in the cost matrix with the number of memory pages associated with the one or more buffers that are accessed by that memory channel.

35. The multi-socket computing platform of clause 33, wherein the multi-socket computing platform further includes means for:
during ongoing run-time operations for the computing platform, updating one or more cells with an updated cost that is dynamically determined.

36. The multi-socket computing platform of clause 35, wherein the updated cost for at least one or the one or more cells for which a cost is updated is determined by monitoring bandwidth along one or more links in the interconnect topology and applying heuristics to update the cost based on the monitored bandwidth.

37. The multi-socket computing platform of any of clauses 31-36, wherein the multi-socket computing platform further includes means for:
identifying, for each of the one or more buffers, one or more memory pages allocated to that buffer;
identifying, for each of the one or more memory pages, a memory channel used to access that memory page; and
determining, for each of the accelerators, a respective cost to access a memory page via each of the memory channels,
wherein the aggregate cost for a given accelerator is determined by summing, for each memory page identified in (i), a cost for accessing that memory page by that accelerator.

38. The multi-socket computing platform of any of clauses 31-37, wherein each processor includes an instruction set architecture (ISA) having an instruction that, upon execution, is enabled to identify memory pages used by a buffer and a memory channel used to access each memory page.

39. The multi-socket computing platform of clause 38, wherein the instruction has a first operand to store a pointer to a data structure in a first register, a second operand to store an address of a buffer in a second register, and a third operand to store a length of the buffer or a number of memory pages spanned by the buffer in a third register, wherein the instruction is configured, upon execution, to populate the data structure with data identifying, for each of the one or more memory pages, a memory channel used to access that memory page.

40. The multi-socket computing platform of clause 38, wherein the processor employs an ARM-based architecture.

41. A method comprising:
determining interconnection topology between a plurality of accelerators and a plurality of memory channels in a computing platform;
constructing a cost matrix including a plurality of cells, wherein each cell is populated with a cost for an accelerator x to read/write data to memory channel y;
in response to a job submission to access a function to be offloaded to an accelerator, identifying accelerators with an available instance of the function;
calculating, using the cost matrix, an accelerator with an available instance of the function having a lowest aggregate cost; and
selecting that accelerator to offload the function to.

42. The method of clause 41, wherein the computing platform is a multi-socket computing platform having a Non-Uniform Memory Access (NUMA) architecture.

43. The method of clause 41 or 42, wherein the job submission identifies one or more buffers to be accessed by an accelerator, the method further comprising:
identifying, for each of the one or more buffers, memory pages used for that buffer; and
identifying, for each memory page that is identified, a memory channel used to access that memory page, and 44. The method of clause 43, further comprising:
determining a number of memory pages associated with the one or more buffers that are accessed by each memory channel; and
calculating a cost for accessing memory pages via that memory channel by multiplying the cost for an accelerator to access the memory channel in the cost matrix with the number of memory pages associated with the one or more buffers that are accessed by that memory channel.

45. The method of clause 43, wherein the computing platform includes a processor that includes an instruction set architecture (ISA) having an instruction that is executed once for each of the one or more buffers to identify memory pages used by that buffer and a memory channel used to access each memory page.

46. The method of clause 45, wherein the instruction has a first operand to store a pointer to a data structure in a first register, a second operand to store an address of a buffer in a second register, and a third operand to store a length of the buffer or a number of memory pages spanned by the buffer in a third register, wherein the instruction is configured, upon execution, to populate the data structure with data identifying, for each of the one or more memory pages, a memory channel used to access that memory page.

47. The method of clause 45, wherein the processor employs an ARM-based architecture.

48. The method of any of clauses 41-47, further comprising: during ongoing run-time operations for the computing platform, updating one or more cells with an updated cost that is dynamically determined.

49. The method of clause 45, wherein the updated cost for at least one or the one or more cells for which a cost is updated is determined by monitoring bandwidth along one or more links in the interconnect topology and applying heuristics to update the cost based on the monitored bandwidth.

50. The method of any of clauses 41-49, wherein the computing platform includes a processor having at least one accelerator integrated on the processor.

51. The method of any of clauses 41-50, wherein the computing platform includes a processor, and the computing platform includes at least one accelerator that is external to the processor.

52. A processor configured to be installed in a computing platform having a plurality of memory devices that are accessed by a plurality of memory channels and having an instruction set architecture (ISA) including an instruction having a first operand to store a pointer to a data structure in a first register, a second operand to store a pointer to a data structure including a set of physical pages, and a third operand to store a number of physical pages in the set of physical pages in a third register, wherein the instruction is configured, upon execution, to populate the data structure with data identifying, for each of the physical pages, a memory channel used to access that physical page.

53. The processor of clause 52, wherein the computing platform employs a multi-socket Non-Uniform Memory Access (NUMA) architecture including multiple sockets, the processor further comprises at least one socket-to-socket interface, and wherein when the processor is installed in one of the multiple sockets the processor is communicatively coupled to a second processor via a socket-to-socket link.

54. The processor of clause 53, wherein multiple memory devices from among the plurality of memory devices are coupled to each of the processor and the second processor via a plurality of memory channels, and wherein the data structure, upon being populated via execution of the instruction, includes data identifying at least one memory channel for each of the processor and the second processor.

55. The processor of any of clauses 52-54, wherein the processor includes at least one accelerator comprising circuitry embedded on the processor.

56. The processor of any of clauses 52-55, wherein the processor employs an Arm-based microarchitecture.

57. The processor of any of clauses 52-55, wherein the processor employs an Intel x86-based microarchitecture.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each apparatus or system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

In the following claims, the terminology one or more buffers collectively requiring access via multiple memory channels encompasses the following. Each buffer will generally be stored in a manner such that the entire buffer can be accessed using a single memory channel, and two separate buffers may use the same or different memory channels. Moreover, the content of a single buffer may be split such that it is stored in more than one memory device or in a single memory device that has multiple channels between the memory controller and the memory device. Thus, it is possible that access to the content of a single buffer may require use of more than one memory channel under these scenarios.

Italicized letters, such as 'x', and 'y' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed on a computing platform including a plurality of accelerators and a plurality of memory devices accessed by a plurality of memory channels, the method comprising:
    determining an interconnection topology between the plurality of accelerators and the plurality of memory channels;
    constructing, based on the interconnection topology, a cost matrix including a plurality of cells, wherein each cell is populated with a cost for an accelerator of the plurality of accelerators to access a memory channel of the plurality of memory channels;
    in response to a job submission to access a function to be offloaded to an accelerator, the function to access one or more buffers, the one or more buffers collectively requiring access via multiple memory channels among the plurality of memory channels,
        identifying accelerators with an available instance of the function;
        calculating, for each identified accelerator, an aggregate cost for accessing the one or more buffers via the multiple memory channels using the cost matrix; and
    selecting the accelerator with the least aggregate cost to offload the function to.

2. The method of claim 1, wherein the computing platform is a multi-socket computing platform having a Non-Uniform Memory Access (NUMA) architecture including shared virtual memory (SVM) in which the one or more buffers are logically stored, and wherein at least a portion of the plurality of accelerators are SVM-capable accelerators.

3. The method of claim 1, further comprising:
    determining a number of memory pages associated with the one or more buffers that are accessed by each memory channel of the plurality of memory channels; and
    calculating a cost for accessing memory pages via that memory channel by multiplying the cost for a corresponding accelerator to access the memory channel in the cost matrix with the number of memory pages associated with the one or more buffers that are accessed by that memory channel.

4. The method of claim 1, further comprising:
    during ongoing run-time operations for the computing platform, updating one or more cells with an updated cost that is dynamically determined.

5. The method of claim 4, wherein the updated cost for at least one or the one or more cells for which a cost is updated is determined by monitoring bandwidth along one or more links in the interconnect topology and applying heuristics to update the cost based on the monitored bandwidth.

6. The method of claim 1, further comprising:
   i. identifying, for each of the one or more buffers, one or more memory pages allocated to that buffer;
   ii. identifying, for each of the one or more memory pages, a memory channel used to access that memory page; and
   iii. determining, for each of the accelerators, a respective cost to access a memory page via each of the memory channels,
   wherein the aggregate cost for a given accelerator is determined by,
      summing, for each memory page identified in (i), a cost for accessing that memory page by that accelerator.

7. The method of claim 1, wherein the computing platform includes a processor that includes an instruction set architecture (ISA) having an instruction that is executed once for each of the one or more buffers to identify memory pages used by that buffer and a memory channel used to access each memory page.

8. The method of claim 7, wherein the instruction has a first operand to store a pointer to a data structure in a first register, a second operand to store an address of a buffer in a second register, and a third operand to store a length of the buffer or a number of memory pages spanned by the buffer in a third register, wherein the instruction is configured, upon execution, to populate the data structure with data identifying, for each of the one or more memory pages, a memory channel used to access that memory page.

9. The method of claim 7, wherein the processor employs an ARM-based architecture.

10. A multi-socket computing platform having a Non-Uniform Memory Access (NUMA) Architecture, comprising:
   a plurality of NUMA nodes, each including,
      a processor comprising a plurality of components including,
         a plurality of processor cores;
         at least one memory controller having a plurality of memory channels;
         a socket-to-socket interface;
         at least one accelerator; and
         internal interconnection circuitry coupling the plurality of components in communication;
      a plurality of memory devices, communicatively coupled to plurality of memory channels on the processor; and
   socket-to-socket interconnection circuitry to enable communication between pairs of processors;
   wherein, upon operation the multi-socket computing platform is configured to,
   determine an interconnection topology between each of the plurality of accelerators and each of the plurality of memory channels;
   construct, based on the interconnection topology, a cost matrix including a plurality of cells, wherein each cell is populated with a cost for an accelerator of the plurality of accelerators to access a memory channel of the plurality of memory channels;
   in response to a job submission via software running on the multi-socket computing platform to access a function to be offloaded to an accelerator, the function to access one or more buffers, the one or more buffers collectively requiring access via multiple memory channels among the plurality of memory channels,
   identify accelerators with an available instance of the function;
   calculate, for each identified accelerator, an aggregated cost for accessing the one or more buffers that are identified via the multiple memory channels using the cost matrix; and
   select the accelerator with the least aggregate cost to offload the function to.

11. The multi-socket computing platform of claim 10, wherein the (NUMA) architecture includes shared virtual memory (SVM) in which the one or more buffers are logically stored, and wherein at least a portion of the plurality of accelerators are SVM-capable accelerators.

12. The multi-socket computing platform of claim 10, wherein, upon operation, the multi-socket computing platform is further configured to:
   determine a number of memory pages associated with the one or more buffers that are accessed by each memory channel of the plurality of memory channels; and
   calculate a cost for accessing memory pages via that memory channel by multiplying the cost for a corresponding accelerator to access the memory channel in the cost matrix with the number of memory pages associated with the one or more buffers that are accessed by that memory channel.

13. The multi-socket computing platform of claim 10, wherein, upon operation, the multi-socket computing platform is further configured to:
   during ongoing run-time operations for the computing platform, update one or more cells with an updated cost that is dynamically determined.

14. The multi-socket computing platform of claim 13, wherein the updated cost for at least one or the one or more cells for which a cost is updated is determined by monitoring bandwidth along one or more links in the interconnect topology and applying heuristics to update the cost based on the monitored bandwidth.

15. The multi-socket computing platform of claim 10, wherein, upon operation, the multi-socket computing platform is further configured to:
   i. identify, for each of the one or more buffers, one or more memory pages allocated to that buffer;
   ii. identify, for each of the one or more memory pages, a memory channel used to access that memory page; and
   iii. determine, for each of the accelerators, a respective cost to access a memory page via each of the memory channels,
   wherein the aggregate cost for a given accelerator is determined by summing, for each memory page identified in (i), a cost for accessing that memory page by that accelerator.

16. The multi-socket computing platform of claim 10, wherein each processor includes an instruction set architecture (ISA) having an instruction that, upon execution, is enabled to identify memory pages used by a buffer and a memory channel used to access each memory page.

17. The multi-socket computing platform of claim 16, wherein the instruction has a first operand to store a pointer to a data structure in a first register, a second operand to store an address of a buffer in a second register, and a third operand to store a length of the buffer or a number of memory pages spanned by the buffer in a third register, wherein the instruction is configured, upon execution, to populate the data structure with data identifying, for each of the one or more memory pages, a memory channel used to access that memory page.

18. The multi-socket computing platform of claim 16, wherein the processor employs an ARM-based architecture.

19. A processor configured to be installed in a computing platform having a plurality of memory devices that are accessed by a plurality of memory channels and having an instruction set architecture (ISA) including an instruction having a first operand to store a pointer to a data structure in a first register, a second operand to store an address of a buffer spanning one or more memory pages in a second register, and a third operand to store a length of the buffer or a number of memory pages spanned by the buffer in a third register, wherein the instruction is configured, upon execution, to populate the data structure with data identifying, for each of the one or more memory pages, a memory channel used to access that memory page, wherein the computing platform employs a multi-socket Non-Uniform Memory Access (NUMA) architecture including multiple sockets, the processor further comprises at least one socket-to-socket interface, and wherein when the processor is installed in one of the multiple sockets the processor is communicatively coupled to a second processor via a socket-to-socket link, and wherein multiple memory devices from among the plurality of memory devices are coupled to each of the processor and the second processor via a plurality of memory channels, and wherein the data structure, upon being populated via execution of the instruction, includes data identifying at least one memory channel for each of the processor and the second processor.

20. The processor of claim 19, wherein the processor includes at least one accelerator comprising circuitry embedded on the processor.

21. The processor of claim 19, wherein the address of the buffer is a virtual memory address.

\* \* \* \* \*